United States Patent [19]

Shimizu et al.

[11] Patent Number: 5,034,477
[45] Date of Patent: Jul. 23, 1991

[54] METHOD OF PREVENTING POLYMER SCALE FORMATION

[75] Inventors: Toshihide Shimizu, Urayasu; Ichiro Kaneko, Hazaki; Mikio Watanabe, Kamisu, all of Japan

[73] Assignee: Shin-Etsu Chemical Co., Ltd., Tokyo, Japan

[21] Appl. No.: 512,595

[22] Filed: Apr. 24, 1990

Related U.S. Application Data

[63] Continuation of Ser. No. 395,584, Aug. 18, 1989, abandoned.

[30] Foreign Application Priority Data

Aug. 19, 1988 [JP] Japan .................................. 1-207185

[51] Int. Cl.$^5$ ................................................ C08F 2/44
[52] U.S. Cl. .......................................... 526/62; 526/74; 526/220; 427/230; 427/384; 252/82; 252/180
[58] Field of Search ........................... 526/62, 74, 220; 427/230, 384; 252/82, 180

[56] References Cited

U.S. PATENT DOCUMENTS 4,068,059  1/1978  Whitenhafer .................. 526/62

FOREIGN PATENT DOCUMENTS 0096319  12/1983  European Pat. Off. ............ 526/62

Primary Examiner—Fred Teskin
Attorney, Agent, or Firm—Oblon, Spivak, McClelland, Maier & Neustadt

[57] ABSTRACT

A method of preventing polymer scale formation in a polymerization vessel during the polymerization of a monomer having an ethylenically double bond, wherein said polymerization is carried out in a polymerization vessel in which its inner wall surface has been previously coated with a coating solution containing (A) at least one member selected from the group consisting of particular anionic dyes, and alkali metal salts and ammonium salts of a sulfonated product obtained by sulfonation of a condensate of a particular aromatic amine compound with a particular aromatic nitro compound, and (B) a particular cationic dye and having a pH of more than 7, and then dried to form a coating. This method can effectively prevent scale formation in the polymerization of extensive monomers having an ethylenically double bond, so that 100 or more polymerization runs can be repeated without formation of polymer scale.

13 Claims, No Drawings

METHOD OF PREVENTING POLYMER SCALE FORMATION

This application is a continuation of application Ser. No. 07/395,584, filed on Aug. 18, 1989, now abandoned.

BACKGROUND OF THE INVENTION

1. Field of the Invention

The present invention relates to a method of effectively preventing polymer scale from sticking, and particularly to a method of preventing polymer scale from sticking in a polymerization vessel during the polymerization of monomers having an ethylenically double bond.

2. Description of the Prior Art

In processes of preparing polymers by polymerizing monomers in a polymerization vessel, known to arise is the problem that the polymer sticks on inner wall surface and so forth of the polymerization vessel in the form of scale. Once the scale of polymer stick on the inner wall surface and so forth of the polymerization vessel, much labor and time are required as a result to remove the scale of polymers. Disadvantages may also result such that the yield of polymers and the cooling capacity of the polymerization vessel are lowered, and the sticked scale of polymers may peel from the surfaces to mix into a product, and the quality of manufactured polymers are thereby made poor.

As methods of preventing polymer scale from sticking on the inner wall surface and so forth of a polymerization vessel, there have been hitherto proposed, for example, a method in which a polar compound, a dye, a pigment or the like is coated on the inner wall surface (Japanese Patent Publication (KOKOKU) Nos. 30343/1970 and 30835/1970), a method in which an aromatic amine compound is coated (Japanese Pre-examination Patent Publication (KOKAI) No. 50,887/1976), and a method in which a reaction product of a phenolic compound with an aromatic aldehyde is coated (Japanese Pre-examination Patent Publication (KOKAI) No. 54,317/1980).

These are effective in preventing polymer scale from sticking, when vinyl halide monomers such as vinyl chloride or monomer mixtures mainly comprised of said vinyl halide monomer are polymerized.

However, in instances in which the monomers to be polymerized comprise other monomers having an ethylenically double bond such as styrene, alpha-methylstyrene, acrylate and acrylonitrile, these monomers have so large a dissolving power against the coating formed by the above sticking-preventing methods that part or the whole of the coating may be dissolved away. Consequently, it becomes impossible to effectively prevent polymer scale from sticking on the inner wall surface and so forth of a polymerization vessel. This sticking of scale particularly tends to occur when the polymerization vessel is made of stainless steel.

Japanese Patent Publication (KOKOKU) No. 46,235/1978 describes a process of polymerizing a vinyl monomer, in which prior to polymerization the inner wall surface of a polymerization vessel has been previously (I) coated with (a) an electron donor organic compound and/or (b) an electron acceptor organic compound, and the coated surface has been treated with at least one selected from (c) oxidizing agent, reducing agent, acid and base, or irradiated with light, or (II) coated with a compound obtained by treating said (a) component and/or said (b) component with said (c) component or obtained by irradiating said (a) component and/or said (b) component with light. As an example, it discloses a coating solution prepared by dissolving Sudan Black B (i.e., C.I.Solvent Black 3) as the (a) component and Nigrosine (i.e. C.I.Acid black 2) as the component (b) in an organic solvent, and treating the solution thus obtained with ethylenediamine at 90° C. In this process, it is essential to react the (a) component and/or (b) component with the (c) component. Although, according to this process, improvement can be obtained to some extent, the number of polymerization runs which can be repeated without formation of polymer scale is only about 30 or less.

As one of methods for improving the scale preventing effects in the polymerization of monomers having an ethylenically double bond, Japanese Patent Publication (KOKOKU) No. 30,681/1985 describes a method in which a condensate obtained by reacting an aromatic amine compound with an aromatic nitro compound at a temperature of from 100° to 250° C. in the presence of a condensation catalyst, is previously coated on the inner wall surfaces, etc. of a polymerization vessel prior to carrying out polymerization. Another method, Japanese Patent Publication (KOKOKU) No. 30,682/1985 describes a method in which an alkali metal salt or ammonium salt of a sulfonated product obtained by sulfonation of the condensate of an aromatic amine compound with an aromatic nitro compound, is previously coated on the inner wall surfaces, etc. of a polymerization vessel prior to carrying out polymerization. According to these methods, scale formation on the inner wall surfaces, etc. of the polymerization can be fairly effectively prevented, so that about 20 to 80 polymerization runs can be repeated with little formation of polymer scale. However, more strong scale preventing effect is required so that productivity may be improved.

SUMMARY OF THE INVENTION

Accordingly, an object of this invention is to provide an improved method that can effectively prevent polymer scale formation even in the polymerization of a vast range of monomers having an ethylenically double bond including ones having a strong dissolving power against the prior art scale-preventive coating.

The present inventors have discovered that the combined use of a particular anionic dye and/or a particular compound among the alkali metal salts and ammonium salts described in Japanese Patent Publication (KOKOKU) No. 30682/1985 in a coating solution having a pH of more than 7 enable 100 or more polymerization runs without formation of polymer scale.

Thus, as a means for solving the above prior art problems, this invention provides a method of preventing polymer scale formation in a polymerization vessel during the polymerization of a monomer having an ethylenically double bond, wherein said polymerization is carried out in a polymerization vessel in which its inner wall surface has been previously coated with a coating solution containing (A) at least one member selected from the group consisting of C.I.Acid Black 1, C.I.Acid Black 2, C.I.Acid Black 124, C.I.Direct Blue 1, C.I.Direct Blue 6, C.I.Direct Blue 71, C.I.Direct Black 2, C.I.Direct Black 19, C.I.Direct Black 32, C.I.-Direct Black 38, C.I.Direct Black 77, C.I.Acid Blue 1, C.I.Acid Blue 2, C.I.Acid Blue 40, C.I.Acid Blue 59, and alkali metal salts and ammonium salts of a sulfonated product obtained by sulfonation of a condensation product (hereinafter simply referred to as condensate) of an aromatic amine compound having the general formula (I):

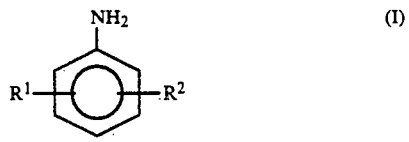

wherein $R^1$ represents a hydrogen atom, $-NH_2$, $-N=N-C_6H_5$, $-NH-C_6H_5$ or $-NH-C_6H_4-NH_2$, and $R^2$ represents a hydrogen atom or $-NH_2$, with an aromatic nitro compound having the general formula (II):

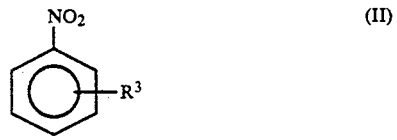

wherein $R^3$ represents a hydrogen atom or $-NH_2$ (these salts are hereinafter generically referred to as "water-soluble condensate"), and (B) at least one member selected from the group consisting of C.I.Solvent Black 3, C.I.Solvent Black 5, C.I.Solvent Black 7, C.I.Solvent Black 22, C.I.Basic Black 2, C.I.Basic Orange 2, C.I.Basic Orange 14, C.I.Solvent Blue 2, C.I.Solvent Blue 11, C.I.Solvent Blue 12, C.I.Solvent Blue 25, C.I.Solvent Blue 35 and C.I.Solvent Blue 36, and having a pH of more than 7, and then dried to form a coating.

According to this invention, it is possible to effectively prevent polymer scale from sticking on the inner wall surface and so forth of a polymerization vessel in the polymerization of monomers having an ethylenically double bond. In particular, it is possible to repeat 100 or more polymerization runs without formation of polymer scale on the inner wall surfaces, etc., so that a high productivity can be achieved even in the polymerization of monomers having a high dissolving power as exemplified by styrene, alpha-methylstyrene, acrylate and acrylonitrile. The coating operation on the inner wall surface and so forth on a polymerization vessel may be carried out for every batch or once in several batches.

DETAILED DESCRIPTION OF PREFERRED EMBODIMENTS OF THE INVENTION

In the method of this invention, it is essential to use said component (A) and said component (B) in combination in the coating solution having a pH of more than 7 to attain the aimed scale preventing effect.

Among the compounds which may be used as the component (A), preferred is C.I.Acid Black 1, C.I.Acid Black 2, C.I.Acid Black 124 and the water-soluble condensates. Most preferred is C.I.Acid Black 2 and the water-soluble condensates.

The water-soluble condensate which may be used as the component (A) can be prepared from the above comound of the general formula (I) and the compound of the general formula (II) by the process described in Japanese Patent Publication (KOKOKU) No. 30,682/1985. The descriptions in this Japanese Patent Publication (KOKOKU) No. 30,682/1985 of the water-soluble condensate and the process of preparing it are incorporated herein by reference.

The aromatic amine compound having the general formula (I) includes, for example, aniline, o-, m- or p-phenylenediamine, p-aminoazobenzene, 2,4-diaminoazobenzene, 4-aminodiphenylamine, 2-aminodiphenylamine and 4,4'-diaminodiphenylamine.

The aromatic nitro compound having the general formula (II) includes, for example, nitrobenzene, and o-, m- or p-aminonitrobenzene.

According to the preparation process described in Japanese Patent Publication (KOKOKU) No. 30,682/1985, first, at least one of the aromatic amine compound of the general formula (I) and at least one of the aromatic nitro compound of the general formula (II) are subjected to condensation reaction in the presence of a mineral acid and a condensation catalyst at a temperature of from 150° to 250° C. to produce the condensate of these two compounds. The reaction time may be usually from 10 to 30 hours. The aromatic nitro compound is preferably used in an amount of 0.15 to 0.50 mole per mole of the aromatic amine compound. The condensation catalyst is used in an amount of 0.03 to 0.50 mole, and the mineral acid is used in an amount of 0.02 to 0.50 mole, per mole of the aromatic amine compound. The mineral acid used includes, for example, hydrochloric acid, nitric acid, oxalic acid, phosphoric acid and sulfuric acid. The condensation catalyst used includes, for example, permanganic acid and its salts such as potassium permanganate, chromic acid related compounds such as chromium trioxide, potassium dichromate and sodium chlorochromate, nitric acid and its salts such as silver nitrate and lead nitrate, halogens such as iodine, bromine, chlorine and fluorine, peroxides such as hydrogen peroxide, sodium peroxide, benzoyl peroxide, potassium persulfate, ammonium persulfate, peracetic acid, cumen hydroperoxide, perbenzoic acid and p-menthane hydroperoxide, oxy acids and the salts thereof such as iodic acid, potassium iodate and sodium chlorate, metal salts such as ferrous chloride, ferric chloride, copper sufate, cuprous chloride, cupric chloride and lead acetate, oxygen compounds such as molecular oxygen and ozone, oxides such as copper oxides, mercury oxides, cerium oxides, manganese dioxide and osmic acid.

Subsequently, the condensate obtained as described above is sulfonated to produce a sulfonation product. The sulfonation reaction may be carried out in conventional manners. For example, the condensate is reacted with a sulfonation agent such as sulfuric acid, fuming sulfuric acid and chlorosulfonic acid in an amount from 2 to 15 times by weight the condensate at a temperature of from 35° to 90° C., thereby the sulfonation product being obtained.

Thereafter, the sulfonation product thus obtained is is reacted with an alkali metal compound such as NaOH, KOH and $Na_2CO_3$ or an ammonium compound such as $NH_4OH$ and $(NH_4)_2CO_3$ to produce the desired water-soluble condensate. Specifically, for example, this reaction may be carried out by adding the alkali metal compound or ammonium compound to the sulfonation product dispersed in water under heating.

The typical examples of preferred water-soluble condensates which may be used as the component (A) include the water-soluble condensate Nos. 3, 5, 10, 16, and 18 as described in Japanese Patent Publication No. 30,682/1985, which water-soluble condensates will be herein described later.

Among the component (B), preferred are C.I.Solvent Black 3, C.I.Solvent Black 5, C.I.Solvent Black 7 and C.I.Solvent Black 22.

In the method of this invention, a coating for preventing polymer scale formation is formed by applying the coating solution to the inner wall surface of the polymerization vessel and, optionally, other parts with which said monomer comes into contact during polymerization, as exemplified by a stirrer shaft and a stirring blade. This coating solution can be prepared by dissolving the component (A) and the component (B) in a suitable solvent and adjusting its pH to more than 7, preferably in the range of from 8 to 11. If the pH of the coating solution is 7 or less, the component (A) and the component (B) are likely to form precipitation in the coating solution and the solution is therefore unstable, so that a good coating can not formed on the inner wall surface, etc. of the polymerization vessel. As the result, the number of repeated polymerization runs carried out without scale formation can not be improved.

The solvent used for preparing the coating solution includes alcohols such as methanol, ethanol, propanol, butanol, 2-methyl-1-propanol, 2-butanol, 2-methyl-2-propanol, 3-methyl-1-butanol, 2-methyl-2-butanol, and 2-pentanol; ketones such as acetone, methyl ethyl ketone, and methyl isobutyl ketone; ethers such as 4-methyldioxolane, and ethylene glycol diethyl ether; esters such as methyl formate, ethyl formate, methyl acetate, and methyl acetoacetate; furans such as tetrahydrofuran, furfural, furfuryl alcohol, and tetrahydrofurfuryl alcohol; aliphatic hydrocarbons such as n-hexane, and n-heptane; aromatic hydrocarbons such as toluene, benzene, and xylene; halogenated hydrocarbons such as methylene chloride, 1-chlorobutane, amyl chloride, ethylene dichloride, and 1,1,2-trichloroethane; and non-protonic solvents such as acetonitrile, formamide, dimethylformamide, dimethylsulfoxide, and N-methyl pyrrolidone. These are used either singly or in combination of two or more kinds.

There are no particular limitations on the concentration of the total of the above component (A) and component (B) so long as the coating weight as described later can be given, but they are usually used in a total concentration of preferably from 0.01 to 5% by weight, and more preferably from 0.05 to 2% by weight. The weight ratio of the component (A)/the component (B) in the coating solution may preferably be usually from 100/0.1 to 100/1,000, and more preferably from 100/3 to 100/250. If this weight ratio is too small, the dye is liable to form agglomeration, so that it is impossible to obtain a uniform coating. If the weight ratio is too large, the resulting coating is likely to be dissolved by water for washing even after the coating There are no particular limitations on the pH adjuster used for adjusting the pH of the coating solution. It includes, for example, sodium hydroxide, potassium hydroxide, sodium carbonate, potassium carbonate, potassium sodium carbonate, ammonium carbonate, ammonium hydroxide, ethylamine, propylamine, isopropylamine, butylamine, sec-butylamine, isobutylamine, ethylenediamine, tetramethylenediamine, pentamethylenediamine, hexamethylenediamine, trimethylenediamine, 1,2,3-triaminopropane, diethylenetriamine, triethylenetetramine, ethyleneimine, ethanolamine, diethanolamine, tris(oxymethyl)methylamine. Ethylenediamine is preferred. These are used singly or in combination of two or more kinds. These may also be previously formed into aqueous solutions so that they can be conveniently used for the purpose of adjusting the pH.

In the method of the present invention, the coating solution is applied on the inner wall surface and so forth of a polymerization vessel, followed by drying to form a coating. As methods of applying and drying the coating solution on the inner wall surface and so forth of a polymerization vessel, any methods may be employed. For example, a method in which, after the solution is applied, air heated to a suitable temperature is blown to the coated surface to dry it, and a method in which the inner wall surface of a polymerization vessel and other parts with which the monomer comes into contact during polymerization are previously heated, and the coating solution is directly applied on the heated inner wall surface and so forth of the polymerization vessel to dry the coated surface. After dried, the coated surfaces are washed with water if necessary.

The method of applying the coating solution is not particularly limited, and may be inclusive of typically of the brush coating, spray coating, the method of filling the polymerization vessel with the coating solution followed by withdrawal thereof, and otherwise the automatic coating methods as disclosed in Japanese Pre-examination Publication (KOKAI) Nos. 61,001/1982, 36,288/1980 and 11,303/1984, Japanese Pre-examination Publication (KOHYO) Nos. 501,116/1981 and 501,117/1981.

Moreover, preferably, the coating solution is applied to parts of recovery system for an unreacted monomer with which the unreacted monomer may come into contact, for example, the inner surfaces of monomer distillation columns, condensers, monomer stock tanks and so forth. Scale formation can be thereby prevented at these parts.

The coating solution may be applied in a coating weight of usually from about 0.001 to 5 g/m$^2$ after dried, on the surfaces of the inner wall, stirrer and so forth of a polymerization vessel.

After the formation of the coating on the inner wall surface of a polymerization vessel, etc., polymerization is carried out in accordance with conventional procedures. That is, a monomer having an ethylenically double bond, a polymerization initiator, and other necessary additives such as a dispersing agent for the monomer, and optionally a polymerization medium may be charged into the polymerization vessel, followed by carrying out polymerization according to conventional manner.

More specifically, in the case of suspension or emulsion polymerization, polymerization is generally carried out by a process comprising the steps of charging water and a dispersing agent into a polymeization vessel, charging a polymerization initiator, evacuating the inside of the polymerization vessel to a pressure of from about 30 mmHg to about 760 mmHg, charging a monomer (the pressure inside the polymerization vessel usually become from 10 to 30 kg.cm$^{-2}$), polymerizing the monomer at a temperature of from about $-10°$ C. to 150° C., and optionally adding at least one of water, the dispersing agent and polymerization initiator during polymerization. The polymerization is judged to be completed when the pressure inside the vessel falls to from about 0 to about 7 kg.cm$^{-2}$G. The water, dispersing agent and polymerization initiator are used in amounts of about 20 to about 300 parts by weight, about 0.01 to about 30 parts by weight, and about 0.01 to about 5 parts by weight, respectively, per 100 parts by weight of the monomer.

In the case of solution polymerization, an organic solvent such as toluene, xylene and pyridine is used as the polymerization medium in place of water. The dispersing agent is optionally used. The other conditions are generally the same as those as described for suspension or emulsion polymerization.

In the case of bulk polymerization, the process typically comprises the steps of evacuating the inside of a polymerization vessel, charging a monomer, and charging a polymerization initiator, and then carrying out polymerization.

The monomer having an ethylenically double bond to which the method of this invention can be applied may include, for example, vinyl halides such as vinyl chloride; vinyl esters such as vinyl acetate and vinyl propionate; acrylic acid and methacrylic acid, or esters or salts of these; maleic acid or fumaric acid, and esters or anhydrides thereof; and diene monomers such as butadiene, chloroprene and isoprene; as well as styrene, alpha-methylstyrene, acrylates, acrylonitrile, halogenated vinylidenes, and vinyl ethers.

The method of this invention is effective regardless of the materials constituting the inner wall and so forth of a polymerization vessel. That is, this method is effective for the inner wall and so forth which are made of any materials as exemplified by stainless steel and glass for lining.

There are no particular limitations on the form of the polymerization to which the method of this invention can be applied. The invention is effective in any forms of polymerization such as suspension polymerization, emulsion polymerization, solution polymerization and bulk polymerization.

Accordingly, any additive materials that are commonly added in a polymerization system can be used without any limitation. More specifically, the method of this invention can effectively prevent polymers from sticking, even in polymerization systems in which such additives are present as exemplified by suspension agents such as partially saponified polyvinyl alcohol, methyl cellulose and polyacrylate; solid dispersants such as calcium phosphate and hydroxyapatite; anionic emulsifying agents such as sodium lauryl sulfate, sodium dodecylbenzenesulfonate and sodium dioctylsulfosuccinate; nonionic emulsifying agents such as sorbitan monolaurate and polyoxyethylene alkylether; fillers such as calcium carbonate and titanium oxide; stabilizers such as tribasic lead sulfate, calcium stearate, dibutyltin dilaurate and dibutyltin mercaptide; lubricants such as rice wax and stearic acid; plasticizers such as DOP and DBP; chain transfer agents such as trichloroethylene and mercaptans; pH adjusters; and polymerization catalysts such as diisopropyl peroxydicarbonate, α,α'-azobis-2,4-dimethylvaleronitrile, lauroyl peroxide, potassium persulfate, cumene hydroperoxide and p-menthane hydroperoxide.

The polymerization for which the method of this invention can be particularly suitable carried out include, for example, suspension polymerization or emulsion polymerization of vinyl halides such as vinyl chloride or vinylidene halides or a monomer mixture mainly comprised of any of these. The method is also suited to polymerizations for which polymerization vessels made of stainless steel are mainly used, for example, polymerizations for preparing beads or latexes of polymers such as polystyrene, polymethyl methacrylate and polyacrylonitrile, preparing synthetic rubbers such as SBR, NBR, CR, IR and IIR (these synthetic rubbers are commonly prepared by emulsion polymerization), and preparing ABS resins.

EXAMPLES

The method of this invention will be described below in detail by way of Examples and Comparative Examples.

In each Table shown below, the experiment numbers marked with an asterisk denote comparative examples, and the other experiment numbers denote working examples of this invention.

EXAMPLE 1

In each experiment, the component (A) and component (B) were dissolved so as to give a concentration of 0.5% by weight in total and the pH was adjusted, and a coating solution was thereby prepared. The component (A) and component (B), weight ratio of (A)/(B) in the coating solution, kinds of the organic solvent used, the weight ratio of the water/organic solvent in the coating solution, and the pH of the coating solution are shown in Table 1. This coating solution was applied on the inner wall surface, stirrer and other parts with which the monomer comes into contact during polymerization, of a polymerization vessel made of stainless steel, having an inner capacity of 100 liters and equipped with a stirrer, and dried at 50° C. for 15 minutes, followed by washing with water. However, in Experiment Nos. 101 to 103, the coating solution was not applied or a coating solution which does not contain any one of the component (A) and component (B) was applied.

In Experiment Nos. 104 to 113 and 117 to 119, any one of the water-soluble condensate Nos. 3, 5, 10, 16 and 18 as described in Japanese Patent Publication (KOKOKU) No. 30,682/1985 was used as the component (A).

Next, into the polymerization vessel thus coated, 26 kg of vinyl chloride, 52 kg of pure water, 26 g of a partially saponified polyvinyl alcohol and 13 g of di-2-ethylhexyl peroxydicarbonate were changed and polymerization was then carried out at 58° C. for 6 hours with stirring.

After the polymerization was completed, the quantity of polymer scale sticking on the inner wall surface of the polymerization vessel was measured. Results obtained are shown in Table 1.

TABLE 1

| Exp. No. | Component (A) | Component (B) | (A)/(B) (Weight ratio) | Solvent Composition | Weight ratio | pH Adjuster | pH | Scale sticking (g/m²) |
|---|---|---|---|---|---|---|---|---|
| 101* | (Not Applied) | | — | — | — | — | — | 1,100 |
| 102* | C.I. Acid Black 2 | — | 100/0 | Methanol | — | — | — | 1,000 |
| 103* | C.I. Acid Black 2 | — | 100/0 | Methanol | — | Ethylene-diamine | 9 | 50 |

TABLE 1-continued

| Exp. No. | Component (A) | Component (B) | Coating solution (A)/(B) (Weight ratio) | Solvent Composition | Weight ratio | pH Adjuster | pH | Scale sticking (g/m²) |
|---|---|---|---|---|---|---|---|---|
| 104 | Condensate No. 18 (1) | C.I. Solvent Black 3 | 100/200 | Methanol | — | Ethylenediamine | 9 | 0 |
|  |  |  |  |  |  |  | 9 | 0 |
| 105 | Condensate No. 18 (1) | C.I. Solvent Black 5 | 100/100 | Water/methanol | 60/40 | Ethylenediamine | 10 | 0 |
| 106 | Condensate No. 5 (1) | C.I. Solvent Black 3 | 100/150 | Methanol | — | Ethylenediamine | 9 | 0 |
| 107 | Condensate No. 5 (1) | C.I. Solvent Black 7 | 100/200 | Water/methanol | 50/50 | Ethylenediamine | 11 | 0 |
| 108 | Condensate No. 3 (1) | C.I. Solvent Black 3 | 100/250 | Methanol | methanol | Ethylenediamine | 10 | 0 |
| 109 | Condensate No. 16 (1) | C.I. Solvent Black 3 | 100/200 | Methanol | — | Ethylenediamine | 11 | 0 |
| 110 | Condensate No. 5 (1) | C.I. Solvent Black 5 | 100/100 | Water/methanol | — | Ethylenediamine | 8 | 0 |
| 111 | Condensate No. 16 (1) | C.I. Solvent Black 7 | 100/50 | Methanol | — | Ethylenediamine | 10 | 0 |
| 112 | Condensate No. 18 (1) | C.I. Solvent Black 3 | 100/100 | Methanol | — | Tetramethyl diamine | 10 | 0 |
| 113 | Condensate No. 18 (1) | C.I. Solvent Black 3 | 100/150 | Water/methanol | 50/50 | NaOH | 11 | 0 |
| 114 | C.I. Acid Black 2 | C.I. Solvent Black 5 | 100/100 | Water/methanol | 50/50 | NaOH | 10 | 0 |
| 115 | C.I. Acid Black 1 | C.I. Solvent Black 7 | 100/100 | Water/methanol | 70/30 | NaOH | 9 | 0 |
| 116 | C.I. Acid Black 2 | C.I. Solvent Black 3 | 100/200 | Water/methanol | 50/50 | NH₄OH | 10 | 0 |
| 117* | Condensate No. 18 (1) | C.I. Solvent Black 3 | 100/200 | Methanol | — | Hydrochloric acid | 5 | 0 |
| 118* | Condensate No. 18 (1) | C.I. Solvent Black 5 | 100/100 | Water/methanol | 60/40 | Sulfuric acid | 6 | 0 |
| 119* | Condensate No. 5 (1) | C.I. Solvent Black 7 | 100/200 | Water/methanol | 50/50 | Phosphoric acid | 3 | 0 |
| 120* | Coating solution of Exp. No. 7 in Example 1 of Japanese Patent Publication No. 46235/1978 (2) | | | | | | | |

REMARKS (1) Japanese Patent Publication (KOKOKU) No. 30,682/1985 describes the water-soluble condensate Nos. 1, 3, 5, 10, 16 and 18 as follows.

Preparation of Water-Soluble Condensate No. 1

A reactor was charged with 200.0 g (2.148 mole) of aniline, 200.0 g (1.849 mole) of o-phenylenediamine. 120.0 g (0.863 mole) of o-oxynitrobenzene and 138.8 g (1.332 mole) of 35% hydrochloric acid, and the content was then cooled to 10° C. or lower. Subsequently, to the mixture, 200.0 g (0.351 mole) of 40% by weight ammonium persulfate was added dropwise, and the mixture obtained was heated to 60° C. and this temperature was maintained for 6 hours. Thereafter, the mixture was heated to 185° C. and allowed to react at this temperature for 15 hours while the water by-produced is distilled off. During the operation, a part of the aniline was incorporated in the distilled water. The aniline incorporated in the water was returned to the reactor after separated from the water. Thereafter, the inner temperature was raised to 210° C. and reaction was carried out at this temperature for five hours.

The reaction mixture (which had an appearance like a molten substance) thus obtained was added into a dilute hydrochloric acid and then heated at 60° C. for three hours. While being warm, the reaction mixture was filtered, so that unreacted aniline and o-phenylenediamine were removed. Further the reaction mixture was washed with water 6 times so that excessive hydrochloric acid might be removed, followed by drying to give 235.2 g of a condensate.

Fifty g of the condensate obtained as described above was mixed with 300 g of concentrated sulfuric acid at a temperature of 30° C. or less, and the mixture was then heated to 40° C. and stirred at this temperature until the content in the reactor came to dissolve in a dilute NH₄OH quickly and completely, thereby being sulfonated. The reaction solution was poured into 1,000 ml of water, so that the sulfonation product was precipitated. After filtered and then washed with water, the sulfonation product was dispersed in 1,000 ml of water. The sulfonation product was dissolved by adding to the dispersion 11.3 g of 40% by weight of aqueous NaOH solution. Thereafter, the solution obtained was evaporated to dryness, and the product thereby obtained was finely divided to give 52.0 g of a water-soluble condensate (a sodium salt of the sulfonation product).

Preparation of Water-Soluble Condensate No. 3, 5, 10, 16 and 18

These water-soluble condensates were prepared under the same conditions and in the same way as in the case of the water-soluble condensate No. 1, except that the aromatic amine compound, aromatic nitro compound, condensation catalyst and mineral acid shown in the following table were used.

| Condensate No. | Aromatic amine compound (mole) | Aromatic nitro compound (mole) | Condensation catalyst (mole) | Mineral acid (mole) |
|---|---|---|---|---|
| 3 | Aniline (0.349) p-Phenylenediamine (0.651) | Nitrobenzene (0.407) | Ammonium persulfate (0.088) | Hydrochloric acid (0.334) |
| 5 | Aniline (0.664) p-Aminodiphenylamine (0.336) | Nitrobenzene (0.402) | Ammonium persulfate (0.098) | Hydrochloric acid (0.297) |
| 10 | Aniline (1.000) | o-Aminonitrobenzene (0.222) | p-Menthane hydroperoxide (0.162) | Sulfuric acid (0.462) |
| 16 | p-Aminodiphenylamine (0.400) o-Phenylenediamine (0.600) | p-Aminonitrobenzene (0.296) | Ferric chloride (0.096) | Hydrochloric acid (0.393) |
| 18 | Aniline (1.000) | Nitrobenzene (0.227) | Ferrous chloride (0.141) | Hydrochloric acid (0.310) |

EXAMPLE 2

In each experiment, component (A) and component (B) were dissolved in a solvent so that the total concentration of the component (A) and component (B) in the resulting coating solution might become 0.25% by weight. Ethylenediamine was added to the solution so as to adjust the pH to 10, and a coating solution was thereby prepared. The component (A) and component (B) used in each experiment, and the weight ratio of (A)/(B) in the coating solution, as well as the solvent used are shown in Table 2.

This coating solution was applied on the inner wall surface, stirrer and other parts with which the monomer comes into contact during polymerization, of a polymerization vessel made of stainless steel, having an inner capacity of 100 liters and equipped with a stirrer, and dried at 70° C. for 10 minutes, followed by washing with water. However, in Experiment No. 201, no coating solution was applied.

Next, into the polymerization vessel thus coated, 24 kg of styrene, 8 kg of acrylonitrile, 40 kg of pure water, 0.8 kg of hydroxyapatite, 16 g of sodium dodecylbenzenesulfonate, 160 g of t-dodecylmercaptan and 160 g of benzoyl peroxide were charged, and polymerization was then carried out at 80° C. for 10 hours with stirring.

After the polymerization was completed, the quantity of polymer scale sticking on the inner wall surface of the polymerization vessel was measured. Results obtained are shown in Table 2.

which the monomer comes into contact during polymerization, of a polymerization vessel made of stainless steel, having an inner capacity of 100 liters and equipped with a stirrer. Then, heating and drying were carried out under conditions as shown in Table 3, followed by washing with water. However, in Experiment No. 301, no coating solution was applied. The coating solutions used in the other Experiment Nos. are the same as those used in Experiment No. of Example 1 or 2 shown in Table 3.

In Experiment No. 312, a coating solution used in Experiment No. 13 in Example 1 described in Japanese Patent Publication (KOKOKU) No. 46235/1978 was used as the coating solution, and neither heating nor drying was carried out after coating.

Next, into the polymerization vessel thus coated, 56 liters of SBR latex (solid content: 23.5%) and 2 kg of an aqueous solution of 0.25 g of sodium formaldehyde sulfoxylate were charged. After the content of the vessel was heated to 80° C., 7 kg of methyl methacrylate containing 1% of cumene hydroperoxide dissolved therein was dropwise added thereto over 2 hours. After the addition was completed, 7 kg of styrene containing 1% of cumene hydroperoxide dissolved therein was dropwise added thereto over 2 hours, and then polymerization was carried out for about 1 hour while keeping the temperature at 80° C.

After the polymerization was completed, the quantity of polymer scale sticking on the inner wall surface of the polymerization vessel was measured. Results ob-

TABLE 2

| Exp. No. | Coating solution Component (A) | Component (B) | (A)/(B) (Weight ratio) | Solvent Composition | Weight ratio | Scale sticking (g/m²) |
|---|---|---|---|---|---|---|
| 201* | (Not Applied) | | — | — | — | 1,000 |
| 202 | Condensate No. 3 (1) | C.I. Solvent Black 5 | 100/40 | Methanol | — | 2 |
| 203 | Condensate No. 10 (1) | C.I. Solvent Black 7 | 100/100 | Methanol | — | 0 |
| 204 | Coating solution of Exp. No. 104 in Example 1 | | | | | 0 |
| 205 | Coating solution of Exp. No. 105 in Example 1 | | | | | 0 |
| 206 | Coating solution of Exp. No. 106 in Example 1 | | | | | 0 |
| 207 | Coating solution of Exp. No. 107 in Example 1 | | | | | 0 |
| 208 | Coating solution of Exp. No. 108 in Example 1 | | | | | 0 |
| 209 | Coating solution of Exp. No. 114 in Example 1 | | | | | 0 |
| 210 | Coating solution of Exp. No. 115 in Example 1 | | | | | 0 |
| 211 | Coating solution of Exp. No. 116 in Example 1 | | | | | 0 |

EXAMPLE 3

In each experiment, a coating solution was applied on the inner wall surface, stirrer and other parts with tained are shown in Table 3.

TABLE 3

| Exp. No. | Coating solution | Drying and heating conditions | Scale sticking (g/m²) |
|---|---|---|---|
| 301* | Not applied | — | 1,200 |
| 302 | Exp. No. 109 | 70° C. × 10 min | 1 |
| 303 | Exp. No. 203 | 60° C. × 10 min | 0 |
| 304 | Exp. No. 104 | 50° C. × 15 min | 0 |
| 305 | Exp. No. 105 | 70° C. × 5 min | 0 |
| 306 | Exp. No. 106 | 40° C. × 30 min | 0 |
| 307 | Exp. No. 107 | 50° C. × 20 min | 0 |
| 308 | Exp. No. 108 | 50° C. × 10 min | 0 |
| 309 | Exp. No. 114 | 50° C. × 20 min | 0 |
| 310 | Exp. No. 115 | 50° C. × 20 min | 0 |
| 311 | Exp. No. 116 | 50° C. × 20 min | 0 |
| 312* | Coating solution of Exp. No. 13 in Example 1 of Japanese Patent Publication No. 46235/1978[2]. | | 30 |

REMARKS (2) Coating solution of Experiment No. 13 in Example 1 Japanese Patent Publication (KOKOKU) No. 46,235/1978

This coating solution is prepared by dissolving Sudan Black B (i.e., C. I. Solvent Black 2) and Nigrosine (i.e., C. I. Acid Black 2) in a molar ratio of 100:100 in ethanol so that the total concentration may become 1% by weight, adding ammonium nitrate in the same amount in molar basis as that of Sudan Black B to the solution, and treating the solution thus obtained at 90° C. for 30 min.

EXAMPLE 4

In each experiment, the procedure of Example 1 was repeated to carry out polymerization, except that the heating and drying after the coating solution was applied were carried out under conditions as shown in Table 4. After the polymerization was completed, the polymer produced was taken out and the inside of the polymerization vessel was washed with water. Thereafter, the operations from washing the inside of the polymerization vessel with water, carrying out the coating to carrying out polymerization in the same manner as the above were repeated, and the number of polymerization runs repeated (number of scale prevented runs) before scale sticking exceeds 1 g/m², was examined. However, no coating solution was applied in Experiment No. 401, and the coating solutions used in Experiment Nos. 402 to 414 are the same as those used in the Experiment Nos. in Example 1 shown in Table 4.

Results obtained are shown in Table 4.

TABLE 4

| Exp. No. | Coating solution | Drying and heating conditions | No. of Scale prevented runs |
|---|---|---|---|
| 401* | Not applied | — | 0 |
| 402 | Exp. No. 110 | 60° C. × 15 min | 143 |
| 403 | Exp. No. 109 | 60° C. × 20 min | 160 |
| 404 | Exp. No. 104 | 50° C. × 15 min | 140 |
| 405 | Exp. No. 105 | 50° C. × 30 min | 160 |
| 406 | Exp. No. 106 | 60° C. × 10 min | 160 |
| 407 | Exp. No. 107 | 60° C. × 10 min | 160 |
| 408 | Exp. No. 108 | 50° C. × 10 min | 120 |
| 409 | Exp. No. 114 | 50° C. × 20 min | 110 |
| 410 | Exp. No. 115 | 50° C. × 20 min | 105 |
| 411 | Exp. No. 116 | 60° C. × 10 min | 114 |
| 412* | Exp. No. 117* | 50° C. × 30 min | 10 |
| 413* | Exp. No. 118* | 60° C. × 10 min | 8 |
| 414* | Exp. No. 119* | 60° C. × 10 min | 5 |
| 415* | Coating solution containing 1.5 wt. % of Celestine Blue in 0.5 N NaOH aqueous solution[3] | — | 2 |
| 416* | Coating solution of Exp. No. 7 in Example 1 of Japanese Patent Publication (KOKOKU) No. 46235/1978[4] | 50° C. × 15 min | 9 |

REMARKS (3) One of the coating solutions disclosed in Japanese Patent Publication (KOKOKU) No. 7,202/1987

(4) Coating solution of Experiment No. 7 in Example 1 of Japanese Patent Publication (KOKOKU) No. 46,235/1978

This coating solution is prepared by dissolving Sudan Black B (i.e., C. I. Solvent Black 2) and Nigrosine (i.e., C. I. Acid Black 2) in a molar ratio of 100:100 in methanol so that the total concentration may become 1% by weight, adding ethylenediamine in the same amount in molar basis as that of Sudan Black B to the solution, and treating the solution thus obtained at 90° C. for 30 min.

We claim:

1. A method of preventing polymer scale formation in a polymerization vessel during the polymerization of a monomer having an ethylenic double bond, wherein said polymerization is carried out in a polymerization vessel in which its inner wall surface has been previously coated with a coating solution consisting of (A) at least one member selected from the group consisting of C.I. Acid Black 1, C.I. Acid Black 2, C.I. Acid Black 124, C.I. Direct Blue 1, C.I. Direct Blue 6, C.I. Direct Blue 71, C.I. Direct Black 2, C.I. Direct Black 19, C.I. Direct Black 32, C.I. Direct Black 38, C.I. Direct Black 77, C.I. Acid Blue 1, C.I. Acid Blue 2, C.I. Acid Blue 40, C.I. Acid Blue 59, and alkali metal salts and ammonium salts of a sulfonated product obtained by sulfonation of a condensate of an aromatic amine compound having the general formula (I):

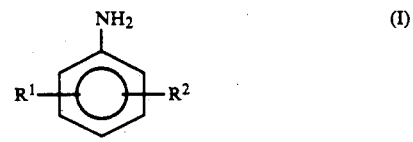

(I)

wherein $R^1$ represents a hydrogen atom, $-HN_2$, $-N=N-C_6H_5$, $-NH-C_6H_5$ or $-NH-C_6H_4-NH_2$, and $R^2$ represents a hydrogen atom or $-NH_2$, with an aromatic nitro compound having the general formula (II)

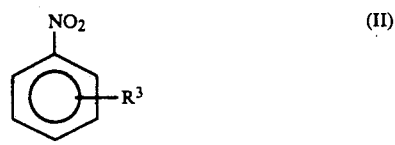

(II)

wherein $R^3$ represents a hydrogen atom or $-NH_2$, (B) at least one member selected from the group consisting of C.I. Solvent Black 3, C.I. Solvent Black 5, C.I. Solvent Black 7, C.I. Solvent Black 22, C.I. Basic Black 2, C.I. Basic Orange 2, C.I. Basic Orange 14, C.I. Solvent Blue 2, C.I. Solvent Blue 11, C.I. Solvent Blue 12, C.I.

Solvent Blue 25, C.I. Solvent Blue 35 and C.I. Solvent Blue 36, and one or more solvents and pH adjusters with the solution having a pH of more than 7, and then dried to form a coating.

2. The method according to claim 1, wherein said component (A) is C.I. Acid Black 1, C.I. Acid Black 2, C.I. Acid Black 124, or said alkali metal salt or ammonium salt of the sulfonation product.

3. The method according to claim 1, wherein said component (B) is C.I. Solvent Black 3, C.I. Solvent Black 5, C.I. Solvent Black 7, or C.I. Solvent Black 22.

4. The method according to claim 1, wherein said coating solution has a pH of from 8 to 11.

5. The method according to claim 1, wherein the pH of said coating solution is adjusted with ethylenediamine.

6. The method according to claim 1, wherein the weight ratio of the component (A)/the component (B) in said coating solution ranges from 100/0.1 to 100/1,000.

7. The method according to claim 1, wherein said coating solution contains said component (A) and said component (B) in a total concentration of from 0.01 to 5% by weight.

8. The method according to claim 1, wherein said coating solution has been previously applied to parts of the polymerization vessel with which the monomer comes into contact during polymerization other than its inner wall surface and then dried to form a coating.

9. The method according to claim 8, wherein said parts with which the monomer comes into contact are selected from the group consisting of a stirring shaft, stirring blade, baffle, header, search coil and condenser.

10. The method according to claim 1, wherein said coating solution has been further previously applied to parts of the recovery system of an unreacted monomer with which the monomer comes into contact and then dried to form a coating.

11. The method according to claim 1, wherein the coating formed has a coating weight of from 0.001 to 5 g/m$^2$.

12. The method according to claim 1, wherein the monomer is at least one member selected from the group consisting of vinyl halides; vinyl esters; acrylic acid and methacrylic acid, or salts of these; maleic acid or fumaric acid, and esters or anhydrides thereof; diene monomers; aromatic vinyl compounds; acrylates; acrylonitrile; halogenated vinylidenes; and vinyl ethers.

13. The method according to claim 1, wherein said polymerization is carried out as suspension polymerization, emulsion polymerization, solution polymerization or bulk polymerization.

* * * * *

UNITED STATES PATENT AND TRADEMARK OFFICE
CERTIFICATE OF CORRECTION

PATENT NO. : 5,034,477
DATED : July 23, 1991
INVENTOR(S) : Toshihide Shimizu et al.

It is certified that error appears in the above-identified patent and that said Letters Patent is hereby corrected as shown below:

ON THE TITLE PAGE, ITEM [30]:

Priority Application number "1-207185"

should read -- 63-207185 --.

Signed and Sealed this

Second Day of March, 1993

Attest:

STEPHEN G. KUNIN

Attesting Officer

Acting Commissioner of Patents and Trademarks